US012656292B2

(12) United States Patent
Lewbart et al.

(10) Patent No.: US 12,656,292 B2
(45) Date of Patent: Jun. 16, 2026

(54) AMPEROMETRIC SENSOR WITH BUBBLE SHEDDING CLIP

(71) Applicant: Rosemount Inc., Shakopee, MN (US)

(72) Inventors: Keith J. Lewbart, Mount Laurel, NJ (US); Charu L. Pandey, Shakopee, MN (US)

(73) Assignee: Rosemount Inc., Shakopee, MN (US)

( * ) Notice: Subject to any disclaimer, the term of this patent is extended or adjusted under 35 U.S.C. 154(b) by 627 days.

(21) Appl. No.: 17/955,718

(22) Filed: Sep. 29, 2022

(65) Prior Publication Data

US 2024/0110886 A1 Apr. 4, 2024

(51) Int. Cl.
*G01N 27/327* (2006.01)

(52) U.S. Cl.
CPC ..... *G01N 27/3274* (2013.01); *G01N 27/3273* (2013.01)

(58) Field of Classification Search
CPC ........... G01N 27/3274; G01N 27/3273; G01N 27/283; G01N 33/1826; G01N 33/1893; G01N 33/182; C02F 2209/23; C02F 2209/29
See application file for complete search history.

(56) References Cited

U.S. PATENT DOCUMENTS

| | | | | | |
|---|---|---|---|---|---|
| 5,674,199 A | * | 10/1997 | Brugger | .............. | A61M 1/3627 604/122 |
| 7,279,031 B1 | * | 10/2007 | Wright | ................ | A61M 1/3627 96/197 |
| 2012/0265139 A1 | * | 10/2012 | Bryan | ................. | A61M 1/3627 604/122 |
| 2013/0092640 A1 | * | 4/2013 | Cassidy | .................. | A61M 5/38 210/801 |
| 2014/0174925 A1 | * | 6/2014 | Mosley | ................ | G01N 27/404 204/414 |
| 2016/0346485 A1 | * | 12/2016 | Mohr | ................. | B01D 19/0031 |
| 2022/0088282 A1 | * | 3/2022 | Forde | .................... | A61M 5/385 |
| 2023/0321363 A1 | * | 10/2023 | Forde | ..................... | A61M 5/38 604/126 |

OTHER PUBLICATIONS

Rosemount, FCL with 1056 transmitter, Instruction manual, LIQ-MAN-FCL-1056, Rev F, Jul. 2017 (Year: 2017).*
"Comprehensive Liquid Analytical Solutions", Rosemount Analytical. Emerson Process Management, retrieved on: Oct. 3, 2022, Retrieved at <<https://www.emerson.com/documents/automation/application-data-sheet-comprehensive-liquid-analytical-solutions-for-bottled-water-industry-europe-rosemount-en-72320.pdf>>, 2 pages.
"Free Chlorine Measuring System", Model FCL, Product Data Sheet, Dated Jul. 2017, Rosemount, 8 pages.

* cited by examiner

*Primary Examiner* — Shizhi Qian
(74) *Attorney, Agent, or Firm* — Christopher R. Christenson; Kelly, Holt & Christenson, P.L.L.C.

(57) ABSTRACT

An amperometric sensor assembly includes an amperometric sensor and a bubble shedding clip. The amperometric sensor has a sensor membrane that is configured to be exposed to a process fluid. The amperometric sensor also has an electrical characteristic that changes based on exposure to an electroactive substance. The bubble shedding clip is coupled to the amperometric sensor and is configured to inhibit the presence of bubbles on the sensor membrane when the sensor membrane is exposed to the process fluid. A water panel including the amperometric sensor assembly is also provided along with a method of installing a bubble shedding clip on an amperometric sensor.

13 Claims, 6 Drawing Sheets

AMPEROMETRIC SENSOR WITH BUBBLE SHEDDING CLIP

BACKGROUND

The average person drinks twenty-nine gallons of water every year. However, drinking water is something that many often take for granted. Drinking water may come in the form of tap water treated by a municipality or from bottled water processed by a supplier. In both such cases, the drinking water must be purified and disinfected.

Drinking water plants across North America often use free chlorine or ozone as the primary disinfectant in water purification. Sometimes, monochloramine is also used as a secondary disinfectant. Drinking water plants often disinfect the water they process by providing a controlled amount of disinfectant to the water. Precise control of the disinfectant is important in order to ensure safe and cost-effective operation. An important aspect of this precise control is the ability to accurately sense the level of disinfectant in the processed water. If the sensed level is lower than the actual amount, too much disinfectant might be added by the controller. Conversely, if the sensed level is higher than the actual amount, too little disinfectant may be used. Additionally, as can be appreciated, drinking water processing is highly regulated and thus improvements in processing must not sacrifice the ability of such solutions to meet stringent regulatory requirements.

SUMMARY

An amperometric sensor assembly includes an amperometric sensor and a bubble shedding clip. The amperometric sensor has a sensor membrane that is configured to be exposed to a process fluid. The amperometric sensor also has an electrical characteristic that changes based on exposure to an electroactive substance. The bubble shedding clip is coupled to the amperometric sensor and is configured to inhibit the presence of bubbles on the sensor membrane when the sensor membrane is exposed to the process fluid. A water panel including the amperometric sensor assembly is also provided along with a method of installing a bubble shedding clip on an amperometric sensor.

DETAILED DESCRIPTION OF ILLUSTRATIVE EMBODIMENTS

Figure 1:
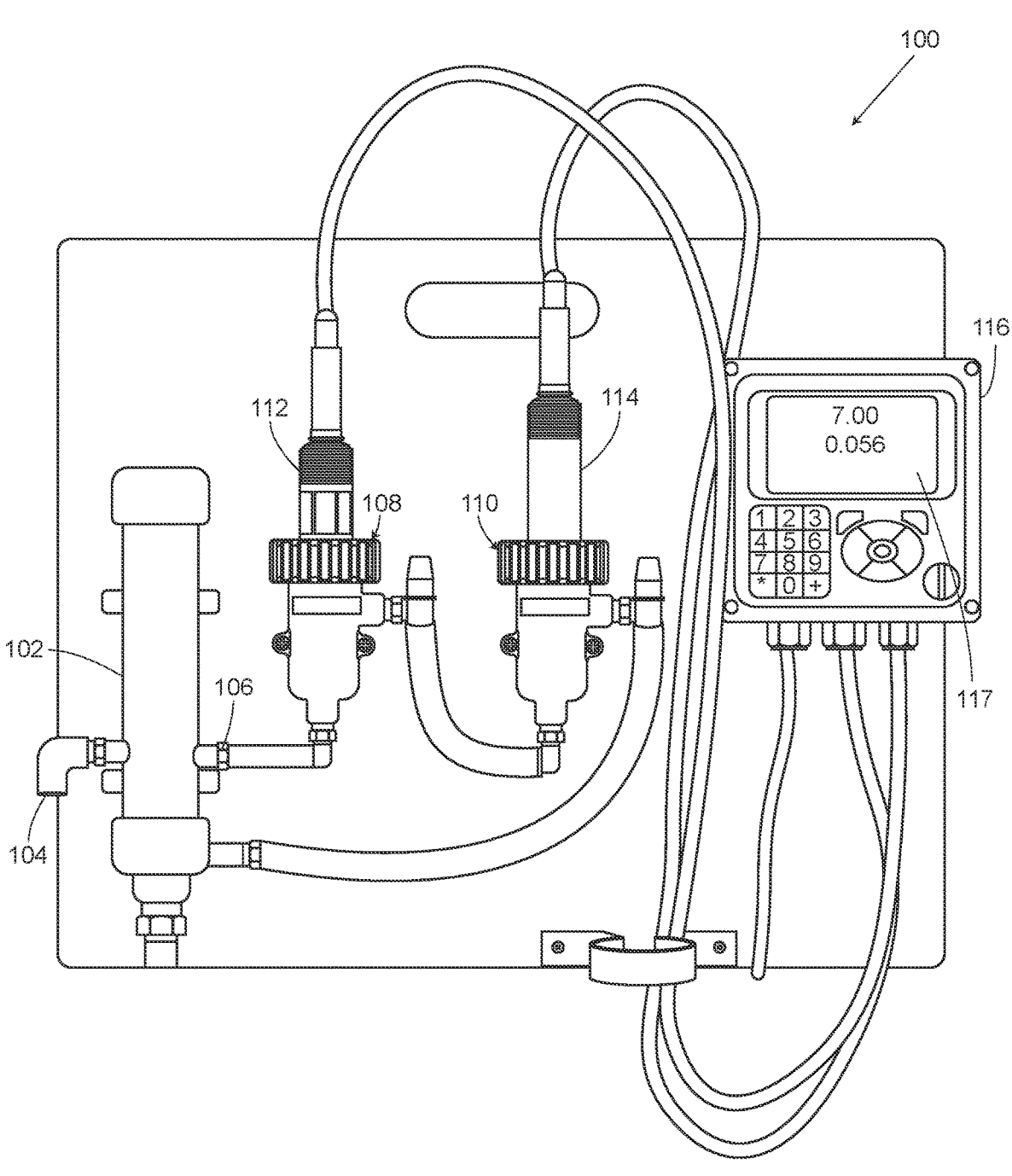
FIG. 1 is a diagrammatic view of a water quality panel in which embodiments described herein are particularly useful.

FIG. 1 is a diagrammatic view of a water quality panel in which embodiments described herein are particularly useful.

Drinking water facilities generally employ a water quality panel, such as quality panel 100, to determine the concentration of residual free chlorine, ozone, or monochloramine after disinfection.

As shown in FIG. 1, a constant head flow controller or low flow controller 102 includes an input 104 where process water enters panel 100. The process water is connected to outer flow tube. Low flow controller 102 includes an outlet 106 that is located higher than inner tube 104 and thus produces enough head pressure to drive the process water flow to the low flow cells 108, 110. Sensors 112, 114 are operably disposed within low flow cells 108, 110, respectively, and are electrically coupled to controller 116. Sensors 112, 114 can be free chlorine sensors, ozone sensors, monochloramine sensors, or other suitable amperometric sensors that provide relevant information to drinking water purification and/or disinfection. In the example shown in FIG. 1, sensors 112, 114, are threaded into their respective low flow cells 108, 110. Controller 116 receives signals from sensors 112, 114 and provides a display 117 indicating process levels. In some examples, controller 116 may also be coupled to one or more pumps that introduce a controlled amount of disinfectant, such as monochloramine, into the process water. One suitable example of controller 116 is sold under the trade designation Model 1056 Intelligent Four-Wire Transmitter sold by the Rosemount Inc., an Emerson Automation Solutions company.

Figure 2:
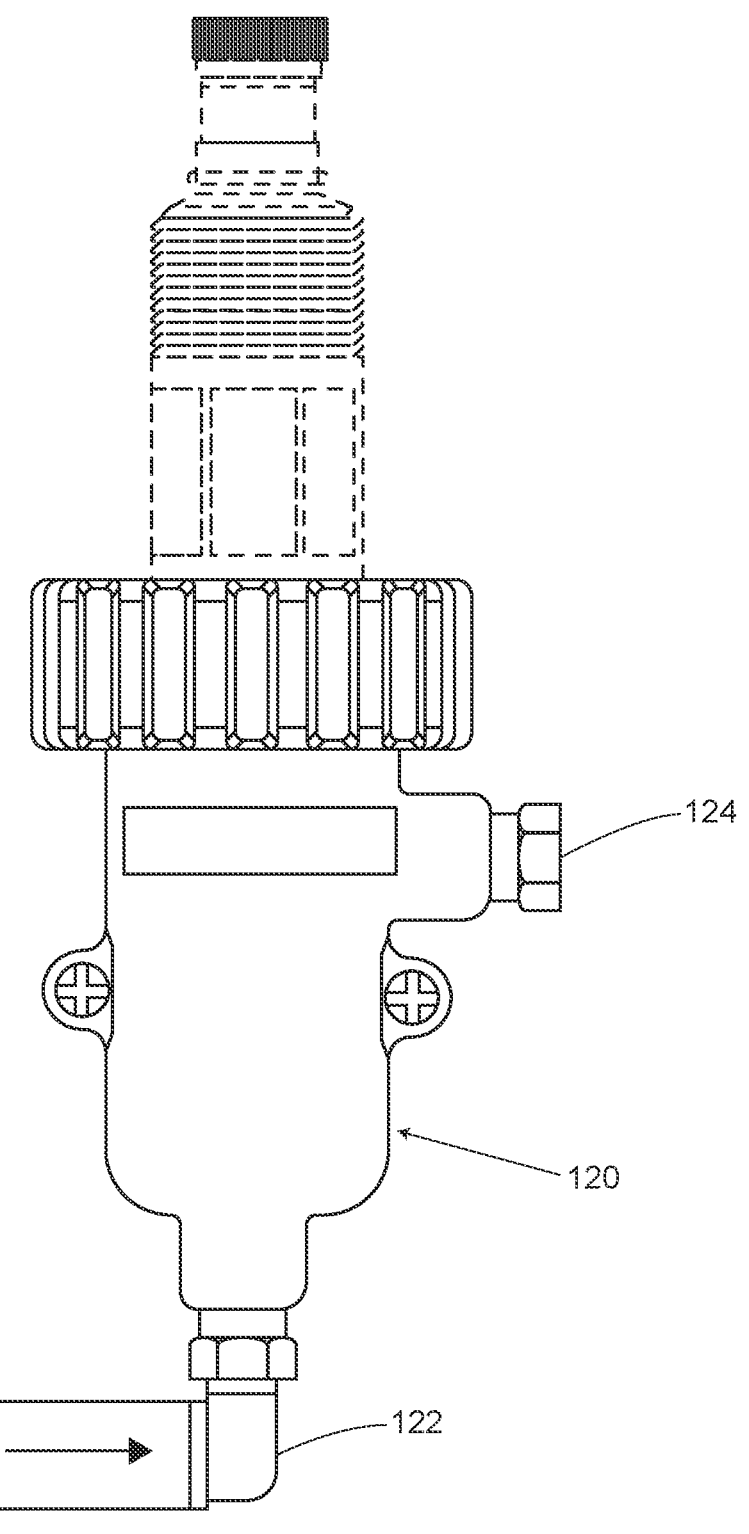
FIG. 2 is a diagrammatic view of a low flow cell.

FIG. 2 is a diagrammatic view of a low flow cell coupled to an analytic sensor (shown in phantom). The process stream enters low flow cell 120 at inlet 122 from the bottom and exits at side port 124. Referring to FIG. 1, after the process stream goes through the last flow cell (shown as flow cell 110) the process stream returns to the inner tube of low flow controller 102 and drains to atmosphere. The top of low flow controller 102 is open to atmosphere as well.

A problem can arise when bubbles form and enter the low flow cells at the bottom. These bubbles can impinge on a sensor membrane and cause significant fluctuations in the concentration readings from analyzer 116. In many cases the output from these readings are used to control a free chlorine pump, so fluctuating concentration readings can lead to loss of valuable reagent or otherwise inject at less than required values. The readings typically fluctuate from negative values to positive values in an erratic manner and stabilize only when the bubbles dissipate.

Figure 3:
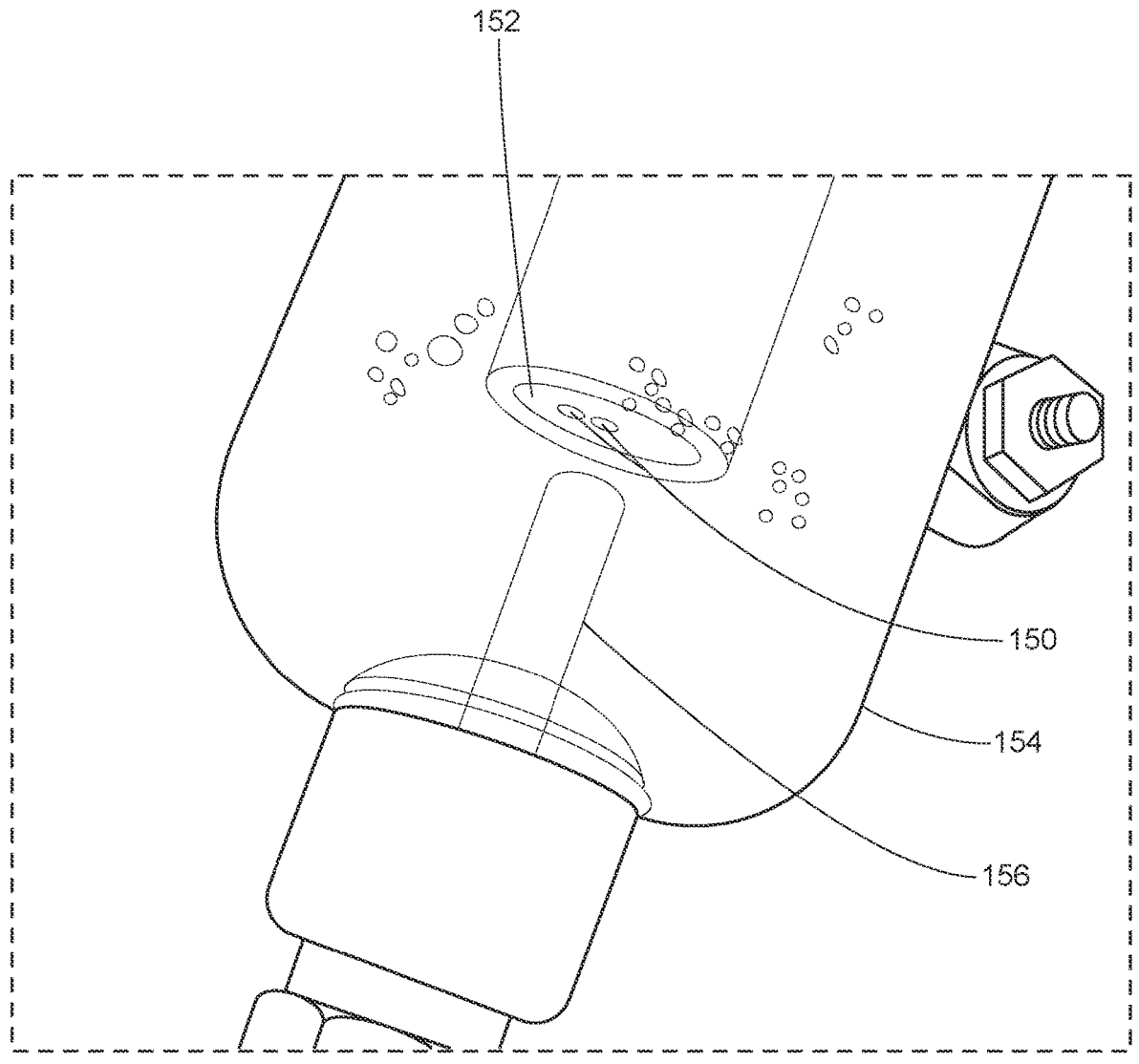
FIG. 3 is a diagrammatic view illustrating bubbles impinging on a free chlorine membrane of an amperometric sensor in a flow cell.

FIG. 3 is a diagrammatic view illustrating bubbles impinging on a free chlorine membrane of an amperometric sensor in a flow cell. FIG. 3 illustrates one or more bubbles 150 resting on a membrane 152 of a free chlorine sensor in a low flow cell 154. This particular low flow cell 154 is equipped with a bubble shedding nozzle 156 which is the protrusion from the entrance of the low flow cell. This bubble shedding nozzle 156 is intended to dissipate bubbles or otherwise redirect them away from membrane 152. However, as can be seen in FIG. 3, some bubbles still manage to form on the membrane 152. Some have attempted to address this bubble formation by generating back pressure on the water panel 100, coupled with adjusting incoming flow rates to the panels. However, bubbles may still persist. While FIG. 3 illustrates a free chlorine sensor, any suitable amperometric sensor can be used, such as a total chlorine sensor, a monochloramine sensor, an ozone sensor, or other amperometric sensors.

Figure 4:
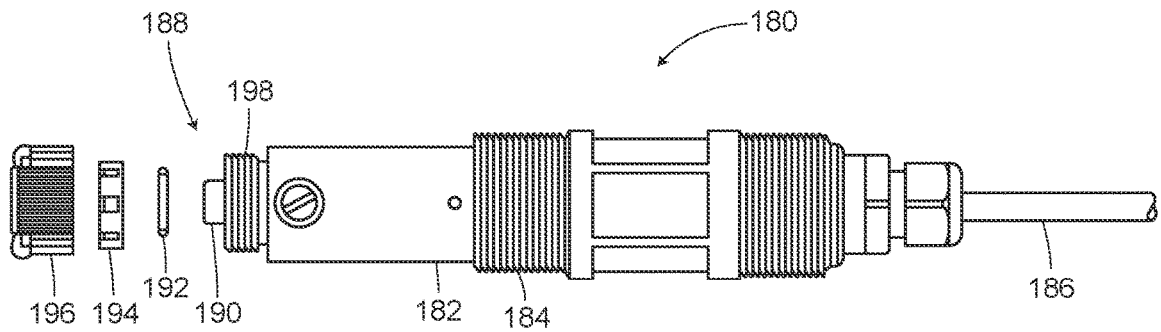
FIG. 4 is an exploded view of an amperometric sensor assembly with which embodiments are particularly applicable.

FIG. 4 is an exploded view of an amperometric sensor assembly with which embodiments described herein are particularly applicable. As shown in FIG. 4, amperometric sensor assembly 180 includes a cylindrical sensor body 182 having an externally-threaded portion 184 to couple to a low flow cell, such as shown in FIG. 1. Additionally, sensor assembly 180 includes an electrical cable 186 that couples sensor 180 to a suitable analyzer, such as analyzer 116 (shown in FIG. 1). A distal end 188 of sensor assembly 180 includes a sensing element, such as cathode 190, that is configured to sense an analyte of interest. An O-ring 192 is configured to be disposed about cathode 190. Membrane assembly 194 seals with O-ring 192 at distal end 188 and is held in place by membrane retainer 196. Membrane retainer 196 includes internal threads, or other suitable features, to engage external threads 198 of distal portion 188 of sensor 180. In this way, the distal end of sensor 180 can be disassembled to replace membrane assembly 194, when desired.

Figure 5:
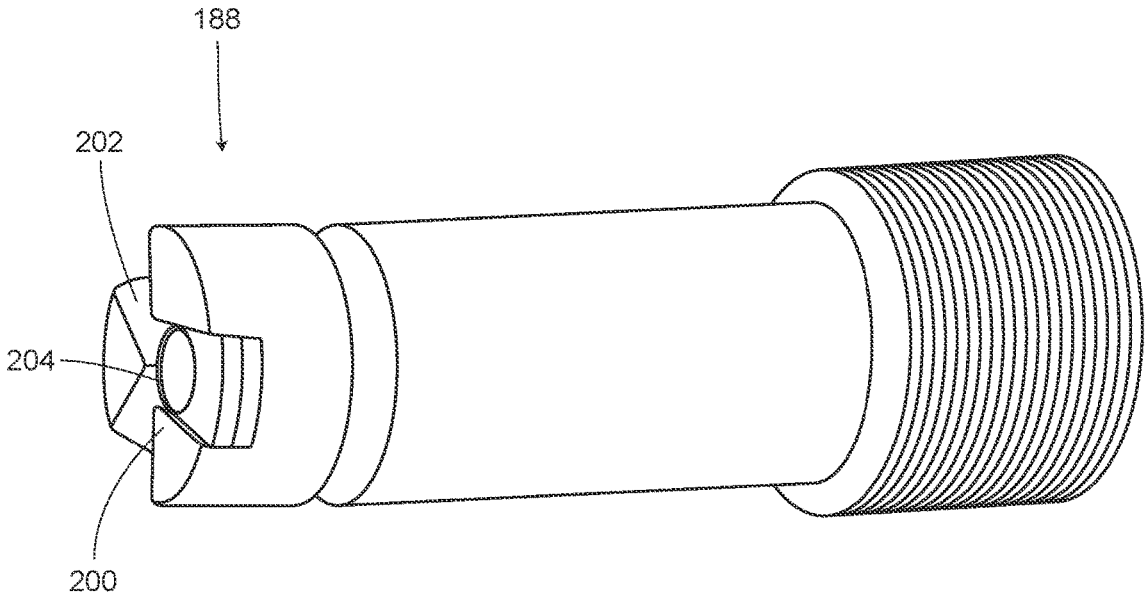
FIG. 5 is a perspective view of an end of an amperometric sensor assembly with which embodiments are particularly applicable.

FIG. 5 is a perspective view of distal end 188 of sensor 180. As shown in FIG. 5, a distal surface 200 of membrane retainer 196 may include one or more channels or grooves as shown in FIG. 5. In the illustrated example, three grooves 202 extend radially outward from central aperture 204.

Figure 6:
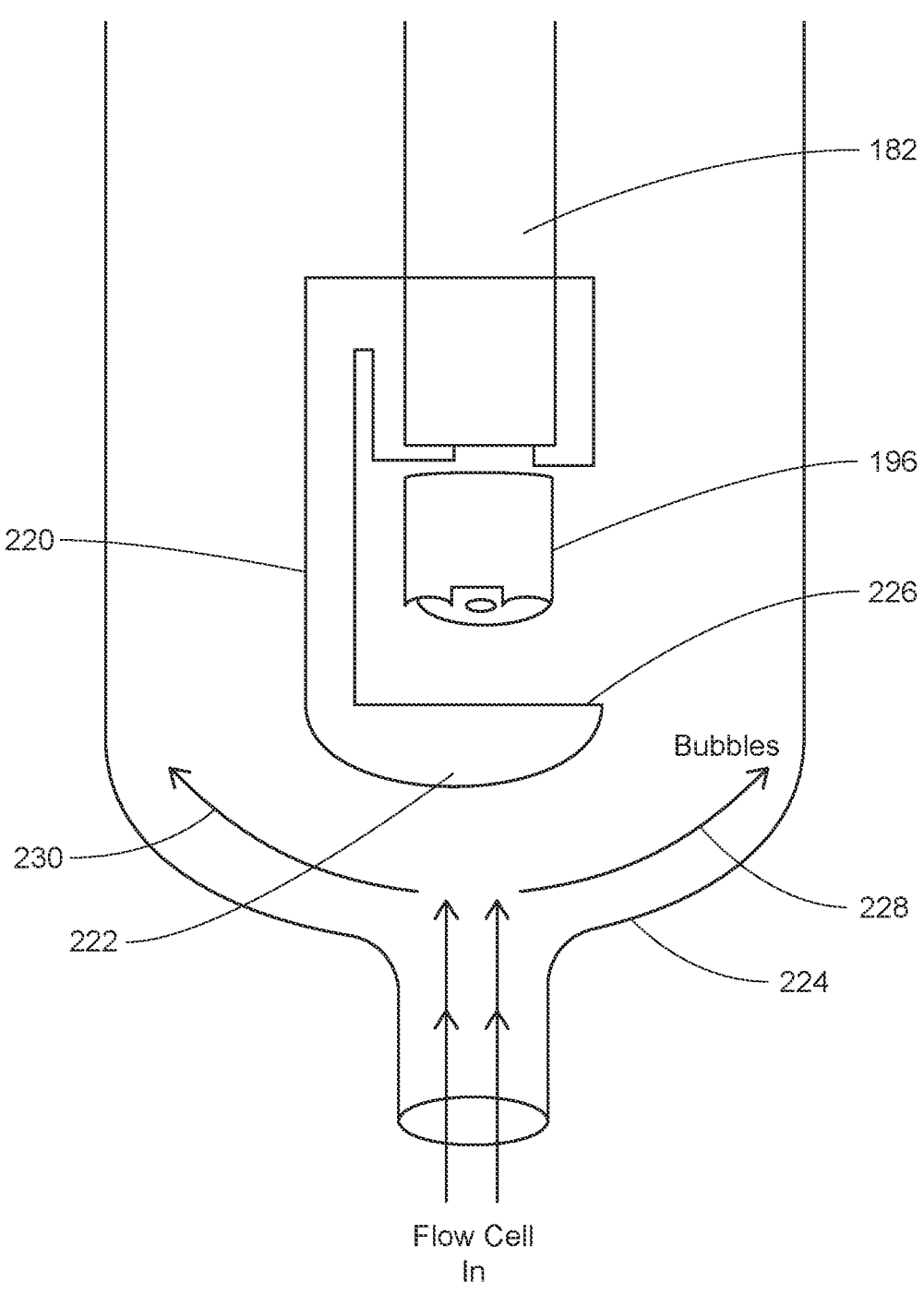
FIG. 6 is a diagrammatic view of a bubble shedding clip attached to an amperometric sensor within a flow cell in accordance with an embodiment of the present invention.

FIG. 6 is a diagrammatic view of a bubble shedding clip attached to an amperometric sensor within a flow cell in accordance with an embodiment of the present invention. In the illustrated example, bubble shedding clip 220 clips into a small gap between membrane retainer 196, and probe body 182. There is a slight bulge 222 at the end of clip 220 that diverts bubbles away from membrane retainer 196. As shown in FIG. 6, as the flow enters low flow cell 224, it encounters bulge 222 of clip 220. The flow is diverted in the direction of arrows 228, 230 such that bubbles are laterally spaced beyond membrane retainer 196. Accordingly, these bubbles will rise with buoyancy and will not encounter membrane retainer 196. However, the fluid itself can easily pass through the lateral opening 226 thereby allowing the sensor to perform its intended function. While the structure shown in FIG. 6 is described as a clip, any suitable structure can be attached to the probe body, and/or retaining assembly that provides bulge 222 to prevent bubbles from encountering the membrane. Additionally, the utilization of a clip allows legacy devices to be easily retrofit as sensors are removed and replaced from low flow cells.

Figure 7:
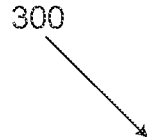
FIG. 7 is a flow diagram of a method of installing a bubble shedding clip on a legacy amperometric sensor in accordance with an embodiment of the present invention.
Figure 7:
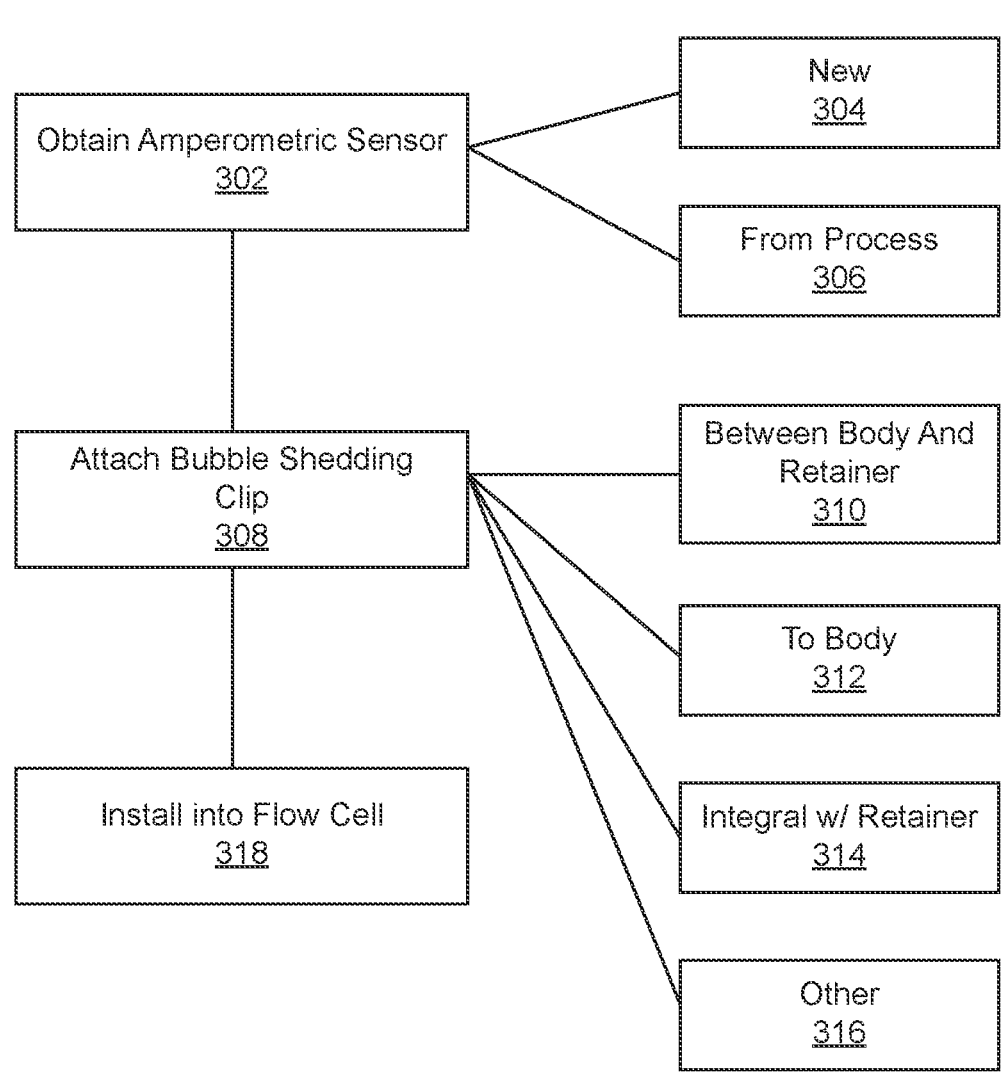

FIG. 7 is a flow diagram of a method of installing a bubble shedding clip on a legacy amperometric sensor in accordance with an embodiment of the present invention. Method 300 begins at block 302 where a user obtains an ampero-metric sensor. The amperometric sensor may be any sensor that measures current as a result of an electroactive sub-stance losing (oxidation) or gaining (reduction) an electron while undergoing an electrochemical reaction. One example of an amperometric sensor is a free chlorine sensor, such as those sold under the trade designation 499ACL family of membrane covered amperometric sensors available from Rosemount Inc. As shown in FIG. 7, the sensor may be a new sensor, as indicated at block 304, or it may be a sensor that has been removed from a process installation, such as by decoupling it from a low flow cell of a water panel, as indicated at block 306. Next, at block 308, a bubble shed-ding clip is attached to the amperometric sensor. As indi-cated at block 310, in one example, this attachment may be in the form of positioning the bubble shedding clip between the sensor probe body and a membrane retainer as the membrane retainer is secured to the probe body. In another example, the bubble shedding clip may be attached directly to the probe body, such as with a circular attachment portion that clips around greater than half of the circular probe body of the sensor, as indicated at block 312. In another example, the bubble shedding clip may be attached to the amperometric sensor by virtue of being integral with a membrane retainer, as indicated at block 314. In such embodiment, the bubble shedding clip would then attach to the probe body in the same way that the membrane retainer does (e.g. by coupling to external threads on the probe body). Other forms of attachment can also be used in accordance with the various embodiments described herein, as indicated at block 316. Next, at block 318, the amperometric sensor with the attached bubble shedding clip is installed into a flow cell to sense process fluid.

Although the present invention has been described with reference to preferred embodiments, workers skilled in the art will recognize that changes may be made in form and detail without departing from the spirit and scope of the invention.

What is claimed is:

1. An amperometric sensor assembly comprising:
an amperometric sensor having a sensor membrane con-figured to be exposed to a process fluid, the ampero-metric sensor having an electrical characteristic that changes based on exposure to an electroactive sub-stance, the amperometric sensor having a cylindrical probe body and a membrane retainer coupled to the cylindrical probe body, the membrane retainer being configured to position the sensor membrane proximate a sensing element of the amperometric sensor;
a bubble shedding clip coupled to the amperometric sensor, the bubble shedding clip being configured to inhibit the presence of bubbles on the sensor membrane when the sensor membrane is exposed to the process fluid; and
wherein the bubble shedding clip is clipped into a gap between the membrane retainer and the cylindrical probe body.

2. The amperometric sensor assembly of claim 1, wherein the amperometric sensor is selected from the group consist-ing of a free chlorine sensor, total chlorine sensor and monochloramine sensor.

3. The amperometric sensor assembly of claim 1, wherein the bubble shedding clip includes a lateral opening config-ured to allow the process fluid to contact the sensor mem-brane.

4. The amperometric sensor assembly of claim 1, wherein the bubble shedding clip includes a bulge configured to prevent the bubbles from encountering the sensor mem-brane.

5. The amperometric sensor of claim 1, wherein the bubble shedding clip is removably coupled to the ampero-metric sensor.

6. A water panel comprising:
a low flow controller having an inlet configured to receive a flow of process fluid, the low flow controller being configured to provide a controlled flow of the process fluid to an outlet;
a low flow cell having an inlet operably coupled to the outlet of the low flow controller, the inlet of the low flow cell being disposed at a bottom of the low flow cell;
an amperometric sensor assembly disposed within the low flow cell, the amperometric sensor assembly including:
an amperometric sensor having a sensor membrane con-figured to be exposed to the process fluid, the ampero-metric sensor having an electrical characteristic that changes based on exposure to an electroactive sub-stance, wherein the amperometric sensor includes a cylindrical probe body and a membrane retainer coupled to the cylindrical probe body, the membrane retainer being configured to position the sensor membrane proximate a sensing element of the amperometric sensor, and a bubble shedding clip coupled to the amperometric sensor, the bubble shedding clip being disposed between the inlet of the low flow cell and the sensor membrane, wherein the bubble shedding clip is clipped into a gap between the membrane retainer and the cylindrical probe body.

7. The water panel of claim 6, wherein the bubble shedding clip includes a lateral opening configured to allow the process fluid to contact the sensor membrane.

8. The water panel of claim 6, wherein the bubble shedding clip includes a bulge configured to prevent bubbles from encountering the sensor membrane.

9. The water panel of claim 6, and further comprising an analyzer electrically coupled to the amperometric sensor assembly, the analyzer being configured to detect the electrical characteristic of the amperometric sensor and provide an output based on the electrical characteristic.

10. The water panel of claim 9, wherein the output is provided to a display.

11. The water panel of claim 9, wherein the output is provided to a reagent pump to control an amount of reagent introduced into the process fluid.

12. The water panel of claim 6, wherein the bubble shedding clip has a circular attachment portion that is clipped around greater than half of the cylindrical probe body.

13. The water panel of claim 6, wherein the amperometric sensor is a legacy amperometric sensor.

\* \* \* \* \*